US009124611B2

(12) United States Patent
Littlefield et al.

(10) Patent No.: US 9,124,611 B2
(45) **Date of Patent: *Sep. 1, 2015**

(54) SYSTEMS AND METHODS FOR WRITING DATA AND STORAGE SYSTEM SPECIFIC METADATA TO NETWORK ATTACHED STORAGE DEVICE

(71) Applicant: CommVault Systems, Inc., Oceanport, NJ (US)

(72) Inventors: Duncan Littlefield, Millstone Township, NJ (US); Ho-chi Chen, Marlboro, NJ (US); Rajiv Kottomtharayil, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/212,080

(22) Filed: Mar. 14, 2014

(65) Prior Publication Data

US 2014/0201250 A1 Jul. 17, 2014

Related U.S. Application Data

(63) Continuation of application No. 11/640,730, filed on Dec. 18, 2006, now Pat. No. 8,677,091.

(51) Int. Cl.
*H04L 29/08* (2006.01)
*G06F 17/30* (2006.01)

(52) U.S. Cl.
CPC .......... *H04L 67/1097* (2013.01); *G06F 17/302* (2013.01); *G06F 17/30126* (2013.01)

(58) Field of Classification Search
None
See application file for complete search history.

(56) References Cited

U.S. PATENT DOCUMENTS

| | | | |
|---|---|---|---|
| 4,084,231 | A | 4/1978 | Capozzi et al. |
| 4,267,568 | A | 5/1981 | Dechant et al. |
| 4,283,787 | A | 8/1981 | Chambers |
| 4,417,321 | A | 11/1983 | Chang et al. |
| 4,641,274 | A | 2/1987 | Swank |
| 4,654,819 | A | 3/1987 | Stiffler et al. |
| 4,686,620 | A | 8/1987 | Ng |

(Continued)

FOREIGN PATENT DOCUMENTS

| | | |
|---|---|---|
| AU | 2004227949 | 10/2004 |
| CA | 2498174 | 3/2004 |

(Continued)

OTHER PUBLICATIONS

Armstead et al., "Implementation of a Campus-Wide Distributed Mass Storage Service: The Dream vs. Reality," IEEE, 1995, pp. 190-199.

(Continued)

*Primary Examiner* — Jared Rutz
*Assistant Examiner* — Marwan Ayash
(74) *Attorney, Agent, or Firm* — Knobbe, Martens, Olson & Bear, LLP

(57) ABSTRACT

A system and method for communicating, browsing, verifying and routing data in storage operation systems using network attached storage devices is provided. In some embodiments, the system may include a management module and a media management component connected to the management server, which interoperate with network attached storage devices to provide the communicating, browsing, verifying and routing functions.

19 Claims, 12 Drawing Sheets

(56) References Cited

U.S. PATENT DOCUMENTS

| | | | |
|---|---|---|---|
| 4,912,637 A | 3/1990 | Sheedy et al. | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,286 A | 4/1994 | Rajani | |
| 5,321,816 A | 6/1994 | Rogan et al. | |
| 5,333,315 A | 7/1994 | Saether et al. | |
| 5,347,653 A | 9/1994 | Flynn et al. | |
| 5,410,700 A | 4/1995 | Fecteau et al. | |
| 5,420,996 A | 5/1995 | Aoyagi | |
| 5,448,724 A | 9/1995 | Hayashi et al. | |
| 5,454,099 A | 9/1995 | Myers et al. | |
| 5,491,810 A | 2/1996 | Allen | |
| 5,495,607 A | 2/1996 | Pisello et al. | |
| 5,504,873 A | 4/1996 | Martin et al. | |
| 5,544,345 A | 8/1996 | Carpenter et al. | |
| 5,544,347 A | 8/1996 | Yanai et al. | |
| 5,559,957 A | 9/1996 | Balk | |
| 5,559,991 A | 9/1996 | Kanfi | |
| 5,619,644 A | 4/1997 | Crockett et al. | |
| 5,638,509 A | 6/1997 | Dunphy et al. | |
| 5,642,496 A | 6/1997 | Kanfi | |
| 5,673,381 A | 9/1997 | Huai et al. | |
| 5,699,361 A | 12/1997 | Ding et al. | |
| 5,729,743 A | 3/1998 | Squibb | |
| 5,751,997 A | 5/1998 | Kullick et al. | |
| 5,758,359 A | 5/1998 | Saxon | |
| 5,761,677 A | 6/1998 | Senator et al. | |
| 5,764,972 A | 6/1998 | Crouse et al. | |
| 5,778,395 A | 7/1998 | Whiting et al. | |
| 5,812,398 A | 9/1998 | Nielsen | |
| 5,813,009 A | 9/1998 | Johnson | |
| 5,813,017 A | 9/1998 | Morris | |
| 5,875,478 A | 2/1999 | Blumenau | |
| 5,887,134 A | 3/1999 | Ebrahim | |
| 5,901,327 A | 5/1999 | Ofek | |
| 5,924,102 A | 7/1999 | Perks | |
| 5,950,205 A | 9/1999 | Aviani, Jr. | |
| 5,974,563 A | 10/1999 | Beeler, Jr. | |
| 6,021,415 A | 2/2000 | Cannon et al. | |
| 6,026,414 A | 2/2000 | Anglin | |
| 6,052,735 A | 4/2000 | Ulrich et al. | |
| 6,058,066 A | 5/2000 | Norris et al. | |
| 6,076,148 A | 6/2000 | Kedem et al. | |
| 6,088,697 A | 7/2000 | Crockett et al. | |
| 6,094,416 A | 7/2000 | Ying | |
| 6,131,095 A | 10/2000 | Low et al. | |
| 6,131,190 A | 10/2000 | Sidwell | |
| 6,148,412 A | 11/2000 | Cannon et al. | |
| 6,154,787 A | 11/2000 | Urevig et al. | |
| 6,161,111 A | 12/2000 | Mutalik et al. | |
| 6,167,402 A | 12/2000 | Yeager | |
| 6,212,512 B1 | 4/2001 | Barney et al. | |
| 6,260,068 B1 | 7/2001 | Zalewski et al. | |
| 6,260,069 B1 | 7/2001 | Anglin | |
| 6,269,431 B1 | 7/2001 | Dunham | |
| 6,275,953 B1 | 8/2001 | Vahalia et al. | |
| 6,301,592 B1 | 10/2001 | Aoyama et al. | |
| 6,324,581 B1 | 11/2001 | Xu et al. | |
| 6,328,766 B1 | 12/2001 | Long | |
| 6,330,570 B1 | 12/2001 | Crighton | |
| 6,330,642 B1 | 12/2001 | Carteau | |
| 6,343,324 B1 | 1/2002 | Hubis et al. | |
| RE37,601 E | 3/2002 | Eastridge et al. | |
| 6,356,801 B1 | 3/2002 | Goodman et al. | |
| 6,389,432 B1 | 5/2002 | Pothapragada et al. | |
| 6,418,478 B1 | 7/2002 | Ignatius et al. | |
| 6,421,711 B1 | 7/2002 | Blumenau et al. | |
| 6,438,595 B1 | 8/2002 | Blumenau et al. | |
| 6,487,561 B1 | 11/2002 | Ofek et al. | |
| 6,516,314 B1 | 2/2003 | Birkler et al. | |
| 6,516,348 B1 | 2/2003 | MacFarlane et al. | |
| 6,519,679 B2 | 2/2003 | Devireddy et al. | |
| 6,538,669 B1 | 3/2003 | Lagueux, Jr. et al. | |
| 6,542,468 B1 | 4/2003 | Hatakeyama | |
| 6,542,972 B2 | 4/2003 | Ignatius et al. | |
| 6,564,228 B1 | 5/2003 | O'Connor | |
| 6,611,849 B1 | 8/2003 | Raff et al. | |
| 6,658,436 B2 | 12/2003 | Oshinsky et al. | |
| 6,658,526 B2 | 12/2003 | Nguyen et al. | |
| 6,721,767 B2 | 4/2004 | De Meno et al. | |
| 6,732,124 B1 | 5/2004 | Koseki et al. | |
| 6,792,472 B1 | 9/2004 | Otterness et al. | |
| 6,820,035 B1 | 11/2004 | Zahavi | |
| 6,836,806 B1 | 12/2004 | Raciborski et al. | |
| 6,839,724 B2 | 1/2005 | Manchanda et al. | |
| 6,925,476 B1 | 8/2005 | Multer et al. | |
| 7,003,641 B2 | 2/2006 | Prahlad et al. | |
| 7,035,880 B1 | 4/2006 | Crescenti et al. | |
| 7,068,597 B1 | 6/2006 | Fijolek et al. | |
| 7,106,691 B1 | 9/2006 | Decaluwe et al. | |
| 7,120,757 B2 | 10/2006 | Tsuge | |
| 7,130,970 B2 | 10/2006 | Devassy et al. | |
| 7,158,985 B1 | 1/2007 | Liskov | |
| 7,162,496 B2 | 1/2007 | Amarendran et al. | |
| 7,174,433 B2 | 2/2007 | Kottomtharayil et al. | |
| 7,246,207 B2 | 7/2007 | Kottomtharayil et al. | |
| 7,315,923 B2 | 1/2008 | Retnamma et al. | |
| 7,340,652 B2 | 3/2008 | Jarvis et al. | |
| 7,389,311 B1 | 6/2008 | Crescenti et al. | |
| 7,395,282 B1 | 7/2008 | Crescenti et al. | |
| 7,395,402 B2 | 7/2008 | Wilson et al. | |
| 7,401,064 B1 | 7/2008 | Arone et al. | |
| 7,440,982 B2 | 10/2008 | Lu et al. | |
| 7,454,569 B2 | 11/2008 | Kavuri et al. | |
| 7,461,230 B1 | 12/2008 | Gupta et al. | |
| 7,464,238 B1 | 12/2008 | Yadav | |
| 7,469,262 B2 | 12/2008 | Baskaran et al. | |
| 7,472,312 B2 | 12/2008 | Jarvis et al. | |
| 7,490,207 B2 | 2/2009 | Amarendran et al. | |
| 7,500,053 B1 | 3/2009 | Kavuri et al. | |
| 7,529,745 B2 | 5/2009 | Ahluwalia et al. | |
| 7,529,782 B2 | 5/2009 | Prahlad et al. | |
| 7,533,181 B2 | 5/2009 | Dawson et al. | |
| 7,536,291 B1 | 5/2009 | Vijayan Retnamma et al. | |
| 7,543,125 B2 | 6/2009 | Gokhale | |
| 7,546,324 B2 | 6/2009 | Prahlad et al. | |
| 7,546,364 B2 * | 6/2009 | Raman et al. | 709/224 |
| 7,603,386 B2 | 10/2009 | Amarendran et al. | |
| 7,606,844 B2 | 10/2009 | Kottomtharayil | |
| 7,613,752 B2 | 11/2009 | Prahlad et al. | |
| 7,617,253 B2 | 11/2009 | Prahlad et al. | |
| 7,617,262 B2 | 11/2009 | Prahlad et al. | |
| 7,617,321 B2 | 11/2009 | Clark | |
| 7,620,710 B2 | 11/2009 | Kottomtharayil et al. | |
| 7,636,743 B2 | 12/2009 | Erofeev | |
| 7,651,593 B2 | 1/2010 | Prahlad et al. | |
| 7,657,550 B2 | 2/2010 | Prahlad et al. | |
| 7,660,807 B2 | 2/2010 | Prahlad et al. | |
| 7,661,028 B2 | 2/2010 | Erofeev | |
| 7,747,579 B2 | 6/2010 | Prahlad et al. | |
| 7,769,890 B2 | 8/2010 | Littlefield et al. | |
| 7,801,864 B2 | 9/2010 | Prahlad et al. | |
| 7,809,914 B2 | 10/2010 | Kottomtharayil et al. | |
| 7,860,968 B2 | 12/2010 | Bornhoevd et al. | |
| 8,073,969 B2 | 12/2011 | Littlefield et al. | |
| 8,170,995 B2 | 5/2012 | Prahlad et al. | |
| 8,229,954 B2 | 7/2012 | Kottomtharayil et al. | |
| 8,285,681 B2 | 10/2012 | Prahlad et al. | |
| 8,307,177 B2 | 11/2012 | Prahlad et al. | |
| 8,364,652 B2 | 1/2013 | Vijayan et al. | |
| 8,370,542 B2 | 2/2013 | Lu et al. | |
| 8,578,120 B2 | 11/2013 | Attarde et al. | |
| 8,677,091 B2 | 3/2014 | Littlefield et al. | |

(56) References Cited

U.S. PATENT DOCUMENTS

| | | | | |
|---|---|---|---|---|
| 2002/0107955 | A1 * | 8/2002 | Rawson, III | 709/224 |
| 2002/0120741 | A1 | 8/2002 | Webb et al. | |
| 2002/0124137 | A1 | 9/2002 | Ulrich et al. | |
| 2002/0181395 | A1 | 12/2002 | Foster et al. | |
| 2003/0005119 | A1 | 1/2003 | Mercier et al. | |
| 2003/0023893 | A1 | 1/2003 | Lee et al. | |
| 2003/0079018 | A1 | 4/2003 | Lolayekar et al. | |
| 2003/0115447 | A1 * | 6/2003 | Pham et al. | 713/153 |
| 2003/0161338 | A1 | 8/2003 | Ng et al. | |
| 2004/0006572 | A1 | 1/2004 | Hoshino et al. | |
| 2004/0054697 | A1 * | 3/2004 | Tsaur et al. | 707/204 |
| 2004/0078632 | A1 | 4/2004 | Infante et al. | |
| 2004/0225437 | A1 | 11/2004 | Endo et al. | |
| 2005/0033988 | A1 * | 2/2005 | Chandrashekhar et al. | 713/201 |
| 2005/0044316 | A1 | 2/2005 | Kottomtharayil et al. | |
| 2005/0188109 | A1 | 8/2005 | Shiga et al. | |
| 2005/0228875 | A1 | 10/2005 | Monitzer et al. | |
| 2005/0246376 | A1 | 11/2005 | Lu et al. | |
| 2006/0010341 | A1 | 1/2006 | Kodama | |
| 2006/0092861 | A1 | 5/2006 | Corday et al. | |
| 2006/0107089 | A1 | 5/2006 | Jansz et al. | |
| 2006/0171315 | A1 | 8/2006 | Choi et al. | |
| 2006/0173969 | A1 | 8/2006 | Wilson | |
| 2006/0215564 | A1 | 9/2006 | Breitgand et al. | |
| 2006/0224846 | A1 | 10/2006 | Amarendran et al. | |
| 2007/0055737 | A1 | 3/2007 | Yamashita et al. | |
| 2007/0101059 | A1 | 5/2007 | Kobayashi et al. | |
| 2007/0130373 | A1 | 6/2007 | Kalwitz | |
| 2007/0185926 | A1 * | 8/2007 | Prahlad et al. | 707/202 |
| 2007/0185939 | A1 | 8/2007 | Prahlad et al. | |
| 2007/0203937 | A1 | 8/2007 | Prahlad et al. | |
| 2007/0226535 | A1 | 9/2007 | Gokhale | |
| 2007/0260609 | A1 | 11/2007 | Tulyani | |
| 2008/0147754 | A1 | 6/2008 | Littlefield et al. | |
| 2008/0147878 | A1 | 6/2008 | Kottomtharayil et al. | |
| 2008/0172532 | A1 | 7/2008 | Chavan et al. | |
| 2008/0205301 | A1 | 8/2008 | Burton et al. | |
| 2008/0250178 | A1 | 10/2008 | Haustein et al. | |
| 2009/0113056 | A1 | 4/2009 | Tameshige et al. | |
| 2009/0319534 | A1 | 12/2009 | Gokhale | |
| 2011/0035419 | A1 | 2/2011 | Littlefield et al. | |
| 2011/0035621 | A1 | 2/2011 | Littlefield et al. | |
| 2012/0150818 | A1 | 6/2012 | Vijayan Retnamma et al. | |
| 2012/0150826 | A1 | 6/2012 | Vijayan Retnamma et al. | |

FOREIGN PATENT DOCUMENTS

| | | |
|---|---|---|
| DE | 69415115.7 | 8/1999 |
| DE | 60020978.4 | 4/2006 |
| EP | 0259912 | 3/1988 |
| EP | 0405926 | 1/1991 |
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| EP | 1384135 | 1/2004 |
| GB | 2447361 | 9/2008 |
| JP | 4198050 | 12/2008 |
| JP | 4267443 | 5/2009 |
| WO | WO 95/13580 | 5/1995 |
| WO | WO 99/12098 | 3/1999 |
| WO | WO 2004/023317 | 3/2004 |
| WO | WO 2006/052872 | 5/2006 |

OTHER PUBLICATIONS

Arneson, "Mass Storage Archiving in Network Environments" IEEE, 1998, pp. 45-50.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5-9, 1995, pp. 420-427, San Francisco, CA.

Eitel, "Backup and Storage Management in Distributed Heterogeneous Environments," IEEE, 1994, pp. 124-126.

Gait, "The Optical File Cabinet: A Random-Access File system for Write-Once Optical Disks," IEEE Computer, vol. 21, No. 6, pp. 11-22 (1988).

Jander, "Launching Storage-Area Net," Data Communications, US, McGraw Hill, NY, vol. 27, No. 4(Mar. 21, 1998), pp. 64-72.

Rosenblum et al., "The Design and Implementation of a Log-Structure File System," Operating Systems Review SIGOPS, vol. 25, No. 5, New York, US, pp. 1-15 (May 1991).

* cited by examiner

SYSTEMS AND METHODS FOR WRITING DATA AND STORAGE SYSTEM SPECIFIC METADATA TO NETWORK ATTACHED STORAGE DEVICE

INCORPORATION BY REFERENCE TO ANY PRIORITY APPLICATIONS

Any and all applications for which a foreign or domestic priority claim is identified in the Application Data Sheet, or any correction thereto, are hereby incorporated by reference under 37 CFR 1.57.

This application is related to the following patents and pending applications, each of which is hereby incorporated herein by reference in its entirety:

U.S. Pat. No. 6,418,478, titled PIPELINED HIGH SPEED DATA TRANSFER MECHANISM, issued Jul. 9, 2002;

Application Ser. No. 09/610,738, titled MODULAR BACKUP AND RETRIEVAL SYSTEM USED IN CONJUNCTION WITH A STORAGE AREA NETWORK, filed Jul. 6, 2000, now U.S. Pat. No. 7,035,880, issued Apr. 25, 2006;

U.S. Pat. No. 6,542,972, titled Logical View and Access to Physical Storage in Modular Data and Storage Management System, issued Apr. 1, 2003;

Application Ser. No. 10/658,095, titled DYNAMIC STORAGE DEVICE POOLING IN A COMPUTER SYSTEM, filed Sep. 9, 2003, now U.S. Pat. No. 7,130,970, issued Oct. 31, 2006;

Application Ser. No. 10/818,749, titled SYSTEM AND METHOD FOR PERFORMING STORAGE OPERATIONS IN A COMPUTER NETWORK, filed Apr. 3, 2004, now U.S. Pat. No. 7,246,207, issued Jul. 17, 2007;

Application Ser. No. 11/640,144, titled SYSTEMS AND METHODS FOR GRANULAR RESOURCE MANAGEMENT IN A STORAGE NETWORK, filed Dec. 15, 2006, now U.S. Pat. No. 8,572,330, issued Oct. 29, 2013.

BACKGROUND OF THE INVENTION

Field of the Invention

The invention relates generally to performing storage operations on electronic data in a computer network, and more particularly, to facilitating storage operations including data stored on a network attached storage device.

The storage of electronic data has evolved over time. During the early development of the computer, storage of electronic data was limited to individual computers. Electronic data was stored in Random Access Memory (RAM) or some other storage medium such as a magnetic tape or a hard drive that was a part of the computer itself.

With the advent of network computing, the storage of electronic data gradually moved from the individual computer to dedicated storage devices accessible via a network. Some of these network storage devices evolved over time into networked tape drives, optical libraries, Redundant Arrays of Inexpensive Disks (RAID), CD-ROM jukeboxes, and other devices. Common architectures also include network attached storage devices (NAS devices) that are coupled to a particular network (or networks) and are used to provide storage capability for various storage operations that may be required by a particular network (e.g., backup operations, archiving, and other storage operations including the management and retrieval of such information).

NAS device typically utilizes a specialized file server or network attached storage system that connects to the network. A NAS device often contains a reduced capacity or minimized operating and file management system (e.g., a microkernel) and normally processes input/output (I/O) requests by supporting common file sharing protocols such as the Unix network file system (NFS), DOS/Windows, and server message block/common Internet file system (SMB/CIFS). Using traditional local area network protocols such as Ethernet and transmission control protocol/internet protocol (TCP/IP), a NAS device typically enables additional storage to be quickly added by connecting to a network hub or switch.

Certain storage management procedures, such as hierarchical storage management (HSM) procedures provides for movement of files from hard disk to slower, less-expensive storage media, or secondary storage over time. As shown in FIG. 1, one migration scheme may include data transfer from a magnetic disk 10 on a computing device to an optical disk 20 and later to a tape 30. Conventional data management software usually monitors hard disk capacity and moves data from one storage level to the next (e.g., from production level to primary storage and/or from primary storage to secondary storage, etc.) based on storage criteria associated with that data such as a storage policy, age, category or other criteria as specified by the network or system administrator. For example, an email system such as MICROSOFT OUTLOOK™. may have attachments "aged off" (i.e., migrated when age requirement is met) from production level storage to a network attached storage device.

Referring to FIG. 2, there is shown a network architecture of a system 200 for performing storage operations on electronic data in a computer network in accordance with the prior art. As shown, system 200 includes a storage manager 201 and one or more of the following: a data store computer 285, a data store 290, a data agent 295, a jobs agent 240, a plurality of media management components 205, which may be referred to as media agents, a plurality of storage devices 215, a plurality of media management component index caches 210 and a storage manager index cache 230.

Data agent 295 is generally a software module that may be responsible for archiving, migrating, and recovering data of data store computer 285 stored in a data store 290 or other memory location. Each data store computer 285 may have a data agent 295 and system 200 can support many data store computers 285.

Each media management component 205 may maintain an index cache 210 which stores index data that system 200 generates during storage operations. The system may maintain two copies of the index data regarding particular stored data. A first copy may be stored with the data copied to a storage device 215. Thus, a tape may contain the stored data as well as index information related to the stored data. In the event of a system restore, the index data stored with the stored data can be used to rebuild a media management component index 205 or other index useful in performing storage operations.

In addition, the media management component 205 that controls the storage operation also may write an additional copy of the index data to its index cache 210. The data in the media management component index cache 210 may be stored on faster media, such as magnetic media, and is thus readily available to the system for use in connection with storage operations and other activities without having to be first retrieved from a slower storage device 215.

Storage manager 201 may also maintain an index cache 230. Storage manager index cache 230 may be used to indicate, track, and associate logical relationships and associations between components of system 200, user preferences, management tasks, and other useful data. For example, storage manager 201 may use its index cache 230 to track logical associations between media management components 205 and storage devices 215. Index caches 230 and 210 may reside on their corresponding storage component's hard disk or other fixed storage device. For example, the media management component 205 may retrieve data from storage manager index cache 230 regarding a storage policy and storage operation to be performed or scheduled for a particular client 285. The media management component 205, either directly or via an interface module, may communicate with the data agent 295 at data store computer 285 regarding the details of an upcoming storage operation.

Jobs agent 240 may also retrieve from index cache 230 information relating to a storage policy 260 associated with data store computer 285. This information may be used in coordinating or establishing actions performed by one or more data agents 295 and one or more media management components 205 associated with performing storage operations for that particular data store computer 285. Such information may also include other information regarding the storage operation to be performed such as retention criteria, encryption criteria, streaming criteria, path information, etc.

Data agent 295 may package or otherwise manipulate client data stored in client data store 290 in accordance with storage policy 260 and/or according to a user preference, and communicate client data to the appropriate media management component(s) 205 for processing. The media management component(s) 205 may store the data according to storage preferences associated with storage policy 260 including storing the generated index data with the stored data, as well as storing a copy of the generated index data in the media management component index cache 210.

As shown in FIG. 2, a network attached storage device 250 and corresponding file server 254 are also connected to storage manager 201. NAS 250 and file server 254 are dedicated applications without a general purpose operating system and generally do not by themselves support software applications, such as a back-up.

NAS devices typically interface with other components, such as those of storage management system 200, or a relatively limited basis. One reason for this is because NAS devices tend to be proprietary. Accordingly, other storage system designers have a limited knowledge of implementation particulars needed to design fully compatible and integrated interfaces for their products.

Moreover, there are many different types of NAS devices, such as WAFL by NETWORK APPLIANCE of Sunnyvale, Calif., the EMC CELERA file system by the EMC Corporation of Hopkinton, Mass., the NETWARE file system by NOVELL of Provo, Utah, and other vendors. Most of these systems export their file systems to host computers such as the common Internet file system (CIFS) or the network file system (NFS), but provide no mechanism to run software on their operating systems or reside on the file system stack to intercept read/write or other data requests.

One solution to this problem is through the use of a proxy media management component 252 connected to file server 254. Proxy media agent 252 runs the applicable software used to move data to NAS 250. Proxy media management component 252 may, for example, issue commands using the Network Data Management Protocol ("NDMP").

Referring now to FIG. 3, a representation of a data structure 310 is shown that may be used by system 200 in moving data to NAS 250. As shown, data structure 310 includes the actual data being moved in a payload 314 as well as a NDMP header 312 preceding payload 314 and NDMP trailer 316 following the payload.

As discussed above, index cache 230 in storage manager 200 may keep track of certain information including the status of storage operations. If a storage operation copying data from data store 290 to NAS 250 is interrupted, for example, index cache 230 may be used to restart the operation and may keep track of the data path, data transferred, data remaining, etc. If data from NAS 250 needs to be restored, data in index cache 230 may also be used to facilitate such a restore operation.

One shortcoming of the NAS architecture described above is the vulnerability associated with the dedicated data transfer path which includes proxy 252. For example, if proxy media management component 252 becomes inoperative or otherwise unavailable, there is generally no way to send data to NAS 250. Similarly, if other media management components in the system are handling less of a load than proxy media management component 252, they are unable to assist media management component 252 as it is the sole media management component designated for NAS 250.

Moreover, should storage manager 201 become inoperative or otherwise unavailable, or its data or associated indexes be corrupted, incomplete, or otherwise unavailable, there is generally no way to rebuild index 230 to with data from NAS 250.

Furthermore, with conventional systems, it is difficult to verify the contents of NAS 250 after data is stored thereon. As discussed above, in general, NAS systems are proprietary and a simple request to verify the data stored on a NAS cannot be performed nor can information regarding the data, such as helpful metadata, be made available.

Therefore, it would be desirable to provide a more robust storage operation system that can more effectively interoperate with NAS devices.

SUMMARY OF THE INVENTION

A system and method for communicating, browsing, verifying and routing data in storage operation systems using network attached storage devices is provided. In some embodiments, the system may include a management module and a media management component connected to the management server, which interoperate with network attached storage devices to provide the communicating, browsing, verifying and routing functions.

BRIEF DESCRIPTION OF THE DRAWINGS

The invention is illustrated in the figures of the accompanying drawings which are meant to be exemplary and not limiting, in which like references are intended to refer to like or corresponding parts throughout, and in which.

DETAILED DESCRIPTION OF THE PREFERRED EMBODIMENT

Figure 4:
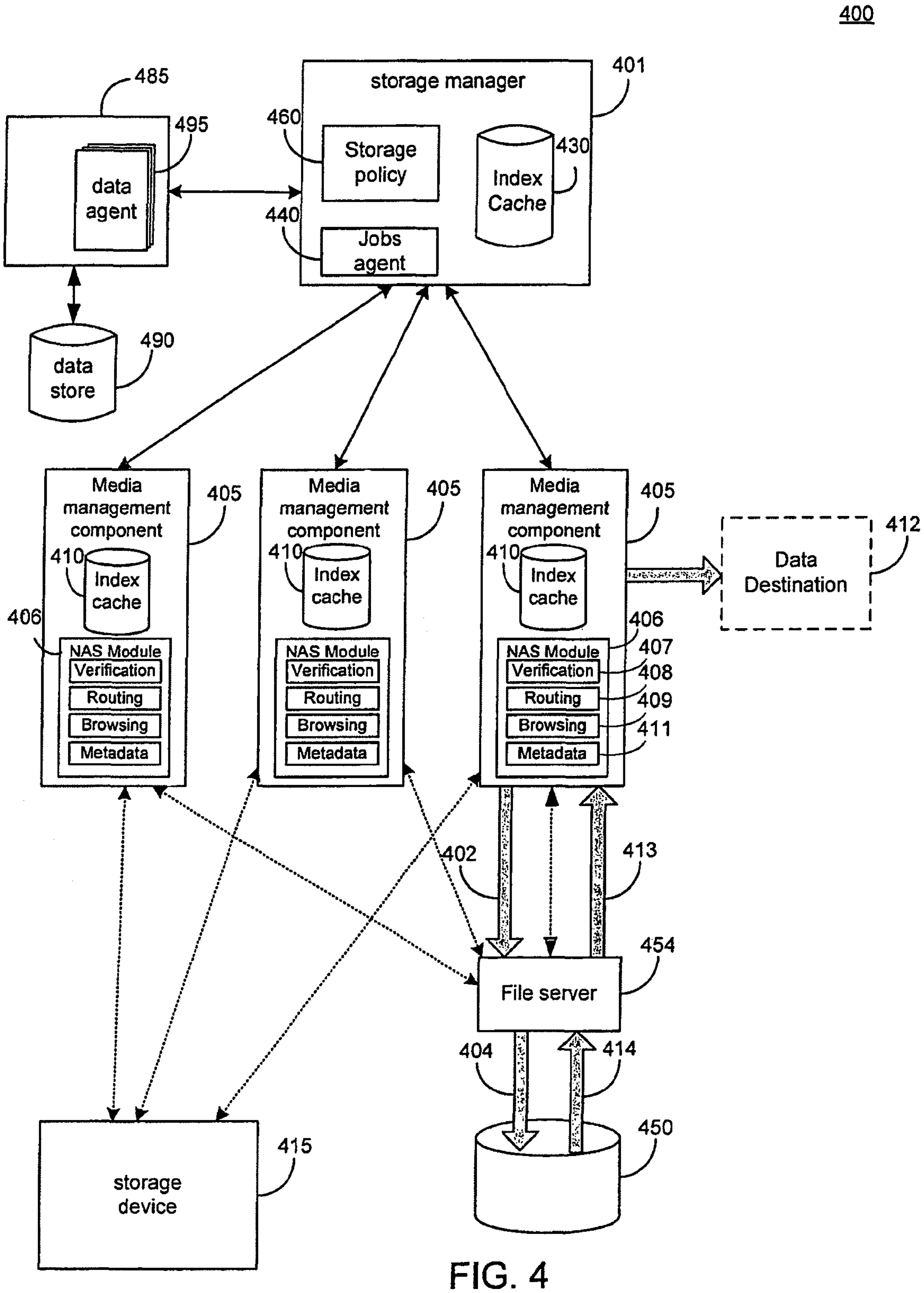
FIG. 4 is a system diagram illustrating a storage operation system constructed in accordance with an embodiment of the invention.

Referring to FIG. 4, a system 400 in accordance with one embodiment of the present invention is shown. System 400 is similar in certain respects to the system described in FIG. 2, and generally includes components and functional blocks which have been numbered similarly to denote some similar functionality and general correspondence. For example, system 400 includes a storage manager 401 (storage manager 201 in FIG. 2), one or more computing devices 485 (computer 285 in FIG. 2, which include clients), data store(s) 490 (data store(s) 290 in FIG. 2), data agent 495, (data agent(s) 295 in FIG. 2) jobs agent(s) 440 (jobs agent 240 in FIG. 2) media management components 405 (components 205 in FIG. 2), storage device 415 (storage devices 215 in FIG. 2), media management component index caches 410 and a storage manager index cache 430 (caches 210 and 230, respectively in FIG. 2) The system and elements thereof are further described in application Ser. No. 09/610,738, now U.S. Pat. No. 7,035,880 which is incorporated by reference in its entirety.

Figure 1:
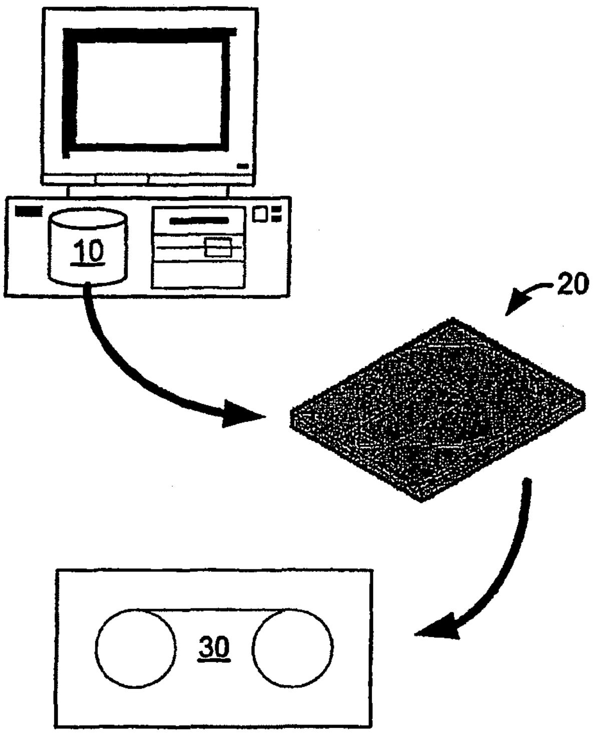
FIG. 1 illustrates a storage operation in accordance with the prior art.
Figure 2:
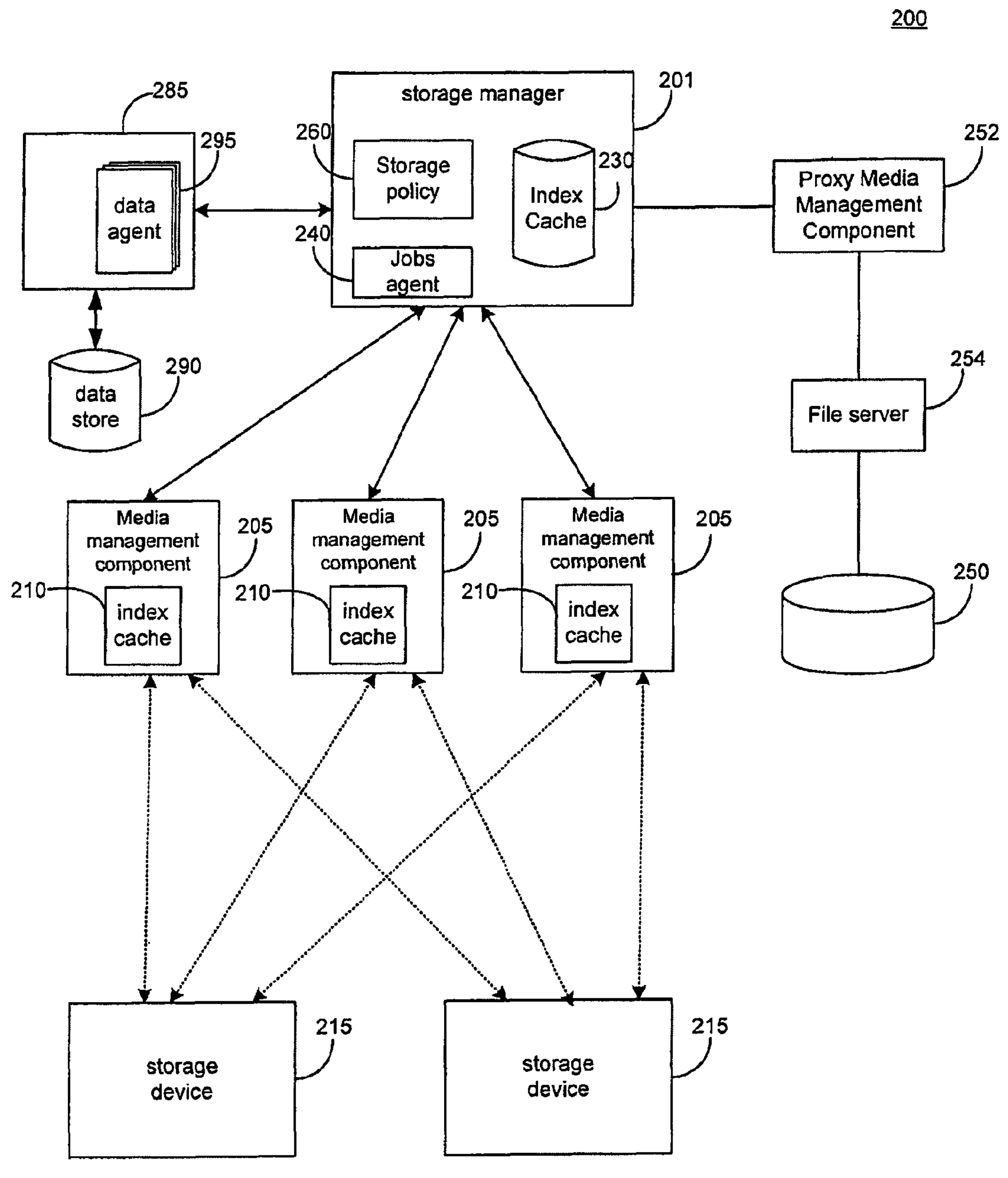
FIG. 2 is a system diagram illustrating a prior art storage system.
Figure 3:
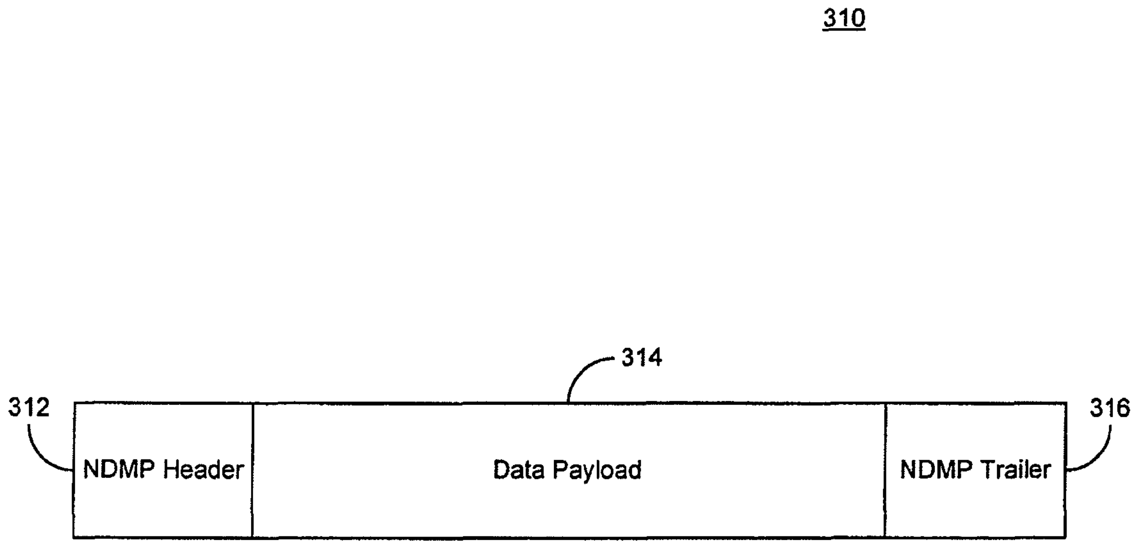
FIG. 3 is a prior art data arrangement.

One way in which system 400 has been improved as compared to the systems shown in FIGS. 1-3, is by the addition of NAS module 406, which may include verification component 407, routing component 408, browsing component 409, and metadata component 411. In some embodiments, NAS module 406 may be installed or distributed across some or all components 405 to facilitate data routing, data verification and browsing, and communication with NAS device 450, among other things.

Data agent 495 is generally a software module that is responsible for archiving, migrating, and otherwise coordinating the transfer and recovery of data from computer 485 or data store 490 to another memory location such as storage device 415 or NAS device 450. Each computer 485 may have one or more associated data agent(s) 495 and system 400 can support many computers 485. System 400 may provide a plurality of data agents 495 each of which may backup, migrate, and recover data associated with a different application. For example, different individual data agents 495 may be designed to handle MICROSOFT EXCHANGE data, LOTUS NOTES data, MICROSOFT WINDOWS file system data, MICROSOFT ACTIVE DIRECTORY OBJECTS data, and other types of data known in the art.

In the case were data store computer 485 has two or more types of data, one data agent 495 may be used for each data type to archive, migrate, and restore computer 485 data (however, in other embodiments, one data agent may handle multiple types of data). For example, to backup, migrate, and restore some or all of the data on a MICROSOFT EXCHANGE 2000 server, computer 485 may use a MICROSOFT EXCHANGE 2000 Mailbox data agent 495 to backup the EXCHANGE 2000 mailboxes, a MICROSOFT EXCHANGE 2000 Database data agent 495 to backup the EXCHANGE 2000 databases, a MICROSOFT EXCHANGE 2000 Public Folder data agent 495 to backup the Exchange 2000 Public Folders, and a MICROSOFT WINDOWS File System data agent 495 to backup the file system. In some embodiments, data agents 495 would may be treated as four separate data agents 495 by system 400 even though they may reside on the same data store computer 485.

Each media management component 405 may maintain an index cache 410 which may store index data system 400 generates during storage operations. This may include, for example, storage operations for MICROSOFT EXCHANGE that generate index data. Index data may include, for example, metadata or other information regarding the location of the stored data on a particular media, information regarding the content of the data stored such as file names, sizes, creation dates, formats, application types, and other file-related criteria, information regarding one or more clients associated with the data stored, information regarding one or more storage policies (discussed below), storage criteria, or storage preferences associated with the data stored, compression information, retention-related information, encryption-related information, stream-related information, and other types of information.

Data in index cache 410 thus provides the system with an efficient mechanism for performing storage operations including information useful in locating files for recovery operations and for managing and tracking stored data. The system generally maintains two or more copies of the index data regarding particular stored data. A first copy may be stored with the data copied to a storage device 415, the other in the index itself. Thus, a tape may contain the stored data as well as index information related to the stored data.

In the event of a system restore or other data restore or refresh operation, the index data included with the stored data may located on storage device 415 and be used to rebuild a media management component index 405 or other index useful in performing storage operations which may include repopulating its index cache 410.

Storage manager 401 may maintain an index cache 430. Storage manager index cache 430 may be used to indicate, track, and associate logical relationships and associations between components of system 400, user preferences, management tasks, and other useful data. For example, storage manager 401 may use its index cache 430 to track logical associations between media management components 405 and storage devices 415. Storage manager 401 may also use its index cache 430 to track the status of storage operations to be performed, storage patterns associated with the system components such as media use, storage growth, network bandwidth, service level agreement ("SLA") compliance levels, data protection levels, storage policy information, storage criteria associated with user preferences, retention criteria, storage operation preferences, and other storage-related information.

Index caches may 430 and 410 may reside on their corresponding storage component's hard disk or other fixed or dynamic storage device or on other associated memory. For example, media management component 405 may retrieve information from storage manager index cache 410 regarding a storage policy and storage operation to be performed or scheduled for a particular computer 485. Media management component 405, either directly or via an interface module, may communicates with the data agent 295 at the data store computer 485 regarding the storage operation.

Jobs agent 440 may also retrieve from index cache 430 a storage policy 460 associated with the data store computer 485 and use information from one or more storage policies 460 to communicate to data agent 495 one or more media management components 405 associated with performing storage operations for that particular data store computer 485 as well as other information regarding the storage operation to be performed such as retention criteria, encryption criteria, streaming criteria, etc.

A storage policy is generally a data structure or other information, which may include a set of preferences and other storage criteria for performing storage operations. The preferences and storage criteria may include, but are not limited to: a storage location, relationships between system components, network pathway to utilize, retention policies, data characteristics, compression or encryption requirements, preferred system components to utilize in a storage operation, and other criteria relating to a storage operation. A storage policy may be stored to a storage manager index, to archive media as metadata for use in restore operations or other storage operations, or to other locations or components of the system.

Data agent 495 may package or otherwise manipulate client data stored in data store 490 in accordance with storage policy 460 and/or according to a user preference, and may communicate this data to the appropriate media management component(s) 405 for processing. Media management component(s) 405 may store the data according to storage preferences associated with the storage policy including storing the generated index data with the stored data, as well as storing a copy of the generated index data in the media management component index cache 410.

Media management component 405 may further include a NAS module 406 including a metadata component 411. NAS module 406 may be implemented as a software module that may be installed on one or more media management components 405. NAS module 406 may interoperate with components 405, data agents 495, and/or storage manager(s) 401 to coordinate and verify the transfer of data from computer(s) 485 to NAS device 450.

As shown in FIG. 4, media management component 405 may further include a NAS component 235 associated with NAS module 406. NAS modules 406 may be associated or resident with each component 405 or may be distributed across various component 405 in system 400 (e.g., every other component 405 may have a NAS module 406, one in three component 405 may have a NAS module 406, or any other desired distribution). Moreover, in some embodiments, one or more components 405 may share a NAS module 406 which may be moved as necessary (e.g., float) to accommodate system storage operations. This provides system 400 with a robust set of routing options to reach NAS devices 450 through multiple components 405.

In some embodiments, each media management component 405 is may be capable of handling storage operations to either a standard storage device 415, or to work with a file server 454 to handle copy operations with a NAS storage device 450. NAS components 435 may, for example, operate using the NDMP protocol. Resource allocation for moving data from data store 490 to NAS 450 may now be based on other relevant characteristics instead of being limited to a particular defined proxy media agent. For example, a data paths 402 and 404 from data from data store 490 to NAS 450 may be defined by properties of NAS 450—for example if NAS 450 includes only particular types of data such as EXCHANGE or OUTLOOK or if NAS 450 is further defined as being the OUTLOOK data for a particular individual—such characteristics may be taken into account when defining which media management component 405 to use for NAS device 450.

Data path 402 and 404 may also be based on storage policy 460 defined for data store 490. For example, a storage policy 460 may be defined for each particular type of data or application—such as EXCHANGE or OUTLOOK. The storage policy could define, for example, where data is to be stored, the duration of the storage, and how many copies should be made. Each storage policy may define one or multiple data paths for moving data from data store 490 to NAS 450. Each data path may include a single media management component or multiple management components and a set of storage devices 415 and/or NAS devices 450.

Storage policies 460 may define a preferred data path 402 and 404 for handling data moving from data store 490 to NAS 450, or define a load balancing algorithm so that data paths may be utilized that have more availability than other data paths. The actual data path selected may, for example, be first based on the properties of NAS device 450, such as data types or application, and then chosen based on storage policy 460 for a preferred data path and/or load balancing. For example, additional NAS devices 450 (not shown) may be operating a minimum capacity with others operating at a higher or near maximum capacity (also not shown). In this case, it may be desirable to distribute data load to underutilized resources. This may be done based on preferences in storage policy or certain load distribution algorithms the govern system operation. For example, in one embodiment, it may be desirable to distribute load across multiple NAS modules 406, NAS devices 450 and associated transmission links such that a substantially even distribution is obtained. In other circumstances, for example, when a certain NAS module 406 is unavailable, it may be desired to continue to send data to a certain NAS device 450, using, however, a different NAS module 406. This may be accomplished with embodiments of the present invention by routing data storage operations to a different NAS module 406 which may communicate and supervise storage operations to the original NAS device 450, even though the now unavailable module 406 was previously handling such operations.

In this way, if a certain media management component 405 becomes inoperative, storage manager 400 may select another media management component 405 in defining a data path to NAS 450. Moreover, storage policy 460 may be defined to perform load balancing. When load balancing is chosen, one option is for storage manager 400 to assign the least loaded media management component to handle a particular storage operation. For example, if a storage policy has three (3) data paths and ten (10) storage operations to perform, the ten jobs may be spread across available media management components. This may mean that multiple operations for a single NAS 450 may be balanced across multiple media management components 405. File server 454 may be used to keep track of applicable copy information so as to improve routing inter-connectivity.

Storage manager 401 may be also used to monitor the capacities of respective media management components 405 and dynamically alter data path 402 and 404. In this way, a copy operation may begin using a first media management component and a first data path and then, because of, for example, a change in the load in system 400, a second data path including a different media management component may be selected to complete the copy operation. For example, if the first media management component that started the copy operation becomes overburdened or inoperative, storage manager 400 may decide to move the copy operation to a different media management component. Moreover, storage manager 401 may choose a data path so as to most efficiently utilize storage media. For example, if using a first data path may result in using a last portion of a first storage medium and a first portion of a second storage medium, storage manager 401 may choose a different data path which results in only a single storage medium being used.

Figure 5:
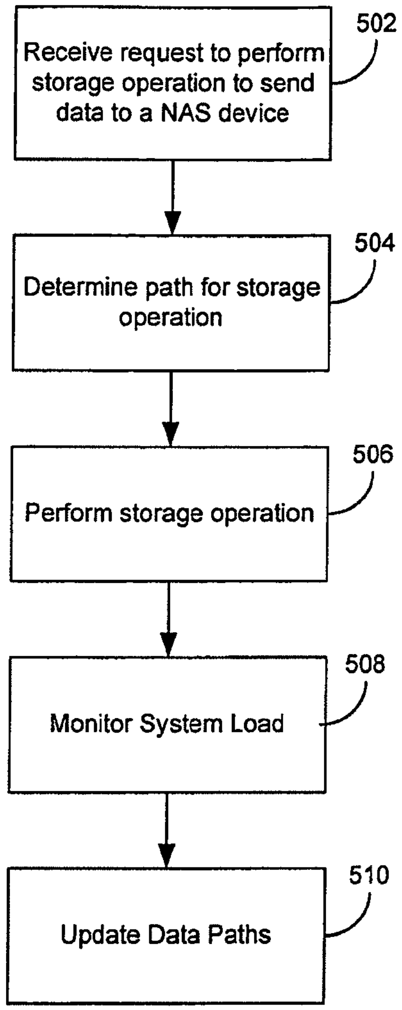
FIG. 5 is a flow chart illustrating some of the steps associated with a method in accordance with an embodiment of the present invention.

Referring now to FIG. 5, some steps associated with a method for facilitating storage operations in accordance with an embodiment of the invention is shown. The method shown in the figure could operate using, for example, system 400 shown in FIG. 4. As shown, at step 502, a request may be received to perform a storage operation including sending data to a network attached storage device. At step 504, a data path may be determined for the source data to the network attached storage device. This may include a determination based on a storage policy or other routing preference. It may also further involve an analysis of the network operating conditions including network congestion of utilization rate of the resources defined in the transmission path, and certain specified load balancing requirements or preferences.

If one or more resources as initially specified are beyond a threshold, the path and/or the destination NAS device may be altered to ensure certain system management operating conditions are achieved/maintained. For example, if a certain media management component, transmission path or destination device is operating beyond a specified level, some or all of those resources may be altered, such that other resources are used instead to meet or maintain system operating specifications. This may include specifying another media management component to handle storage operations to a NAS device that was previously associated with another different media management component. Moreover, it will be understood that such resource reallocation may occur dynamically (e.g., upon consideration of network operating conditions), or as specified by a user, or in recognition of a system change, such as removal of certain hardware such as a NAS device, or computing devices, etc. This may be accomplished by a storage manager or other system management module.

At step 506, once the route and destination resource has been established, the storage operation is performed. This may involve moving one or more chunks of data associated with an archive file, etc. This may also involve confirming that the data has successfully been stored, and writing file location, size, and other index information to indexes in media management components or storage managers.

Moreover, in some embodiments, the system may perform additional monitoring of the resources operation while performing the storage operation to determine the effect of the operation on system resources (step 508). Such load measurement may determine, for example, whether particular devices in the system are more loaded with data than other devices and also determines whether particular devices have no load—such as, for example, if such devices have become inoperative. This additional information may be used at step 510, where the system may determine if there is a load imbalance or whether that a device on the chosen data path is no longer operative. This may be confirmed by performing certain tests on the data path to determine, if, it is in fact inoperative. In some embodiments, such further monitoring may be performed at step 504. Moreover, based on this information, the system may further redefine or reallocate system resources to distribute data load substantially evenly across network resources, or conserve media usage, or promote other load balancing goals (e.g., distribute data operations across network resources in view of a the need to remain within a copy or backup window, or other operating condition such as a data path preference etc.). Moreover, it will be understood that system monitoring and analysis with respect to load balancing may be performed iteratively at steps 504 and 510 with resource reallocation occurring on a continuous basis based on the results of the monitoring and analysis.

Referring back now to FIG. 4, media management component 405 may further include a metadata component 411. As data is copied from data store 490 is to NAS 450, the path may include media management component 405 and metadata component 411. Metadata component 411 may generate certain storage metadata, which may include, for example a storage header and trailer, including management information associated with system 400, which may be appended to any data copied (such as a data "chunk"). This metadata may include the size of the data, path information, offsets, client ID information, information relating to the source data such as, which archive file a chunk may be associated with, what files are in the chunk, chunk number, and any other data useful for data management, etc. This metadata may be separated into a header and trailer and appended to the data as described below.

Figure 6:
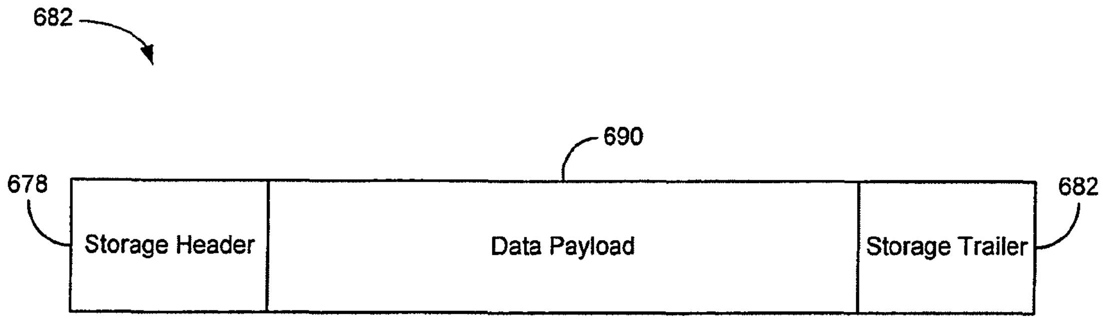
FIG. 6 is a representation of a data structure constructed in accordance with an embodiment of the present invention.

For example, in FIG. 6, data chunk 690 and metadata header 678 and metadata trailer 682 may be combined to produce the data structure shown. Metadata may be separated between header 678 and trailer 682 as desired for system management purposes. For example, header 678 may include the size of the data, and offsets, while trailer 682 may include path information, client ID information, job ID, information relating to the source data such as, which archive file a chunk may be associated with, what files are in the chunk, chunk number, etc. However, any useful arrangement may be used, if desired.

In operation, media management component 405 and metadata component 411 may generate the data arrangement shown in FIG. 6 and using write commands, for example, the NDMP protocol, may send data along with metadata as shown in FIG. 6 to file server 454 for subsequent storage in NAS 450. In some embodiments, file server 454 may remove any NDMP header or trailer, and add metadata created by component 411 and store the combination on NAS 450. Data may be retrieved by a media management component when a computing device 485 or storage manager 401 issues a data or system restore request. In this case, the media management component may query file server 454 on behalf of the requesting device for the requested information (which may be retrieved via paths 413 and 414 and subsequently routed to the appropriate destination).

Figure 7:
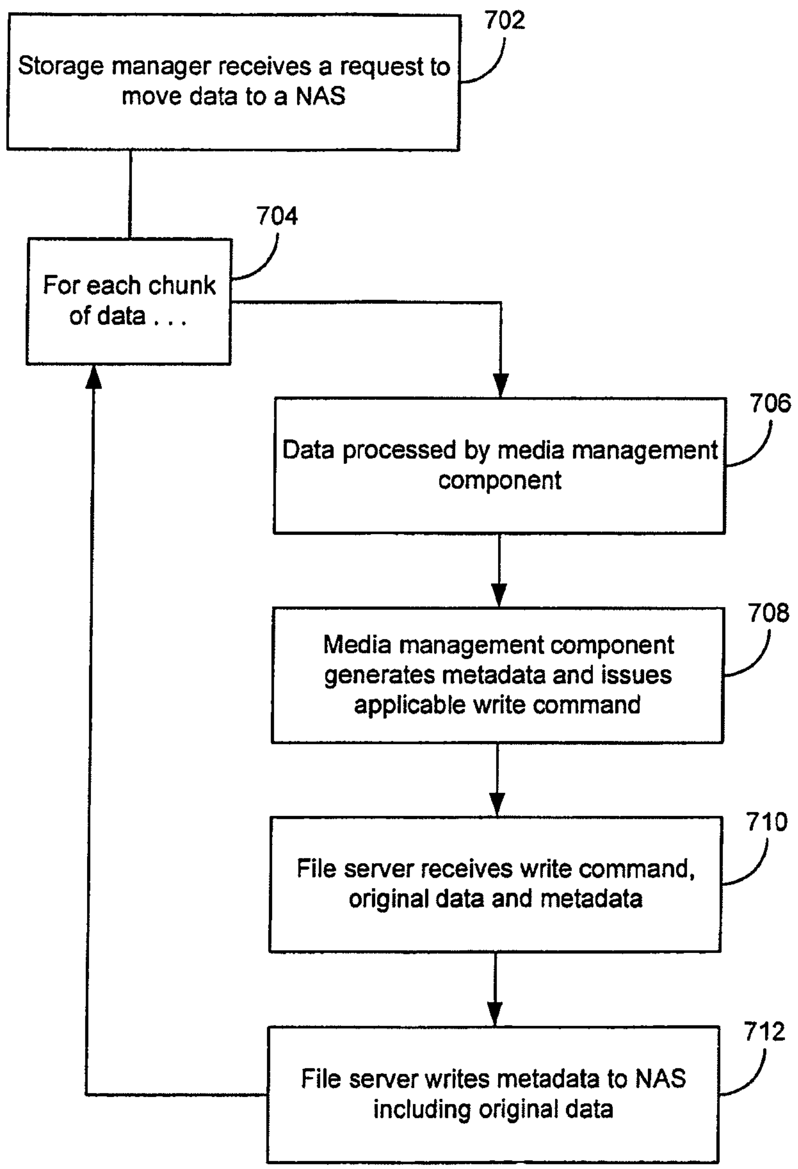
FIG. 7 is a flow chart illustrating some of the steps associated with a method in accordance with an embodiment of the present invention.

Referring to FIG. 7, there is shown a method for facilitating storage operations including NAS in accordance with an embodiment of the invention. The process could be used with, for example, system 400 shown in FIG. 4. As step 702, a request is received by a storage manager or media management component to move data to a network attached storage device. At step 704, a routine, which may be recursive, is initiated for each group of data, such as a chuck, to be moved. This may involve evaluating path and destination information or preferences, and obtaining metadata relating to the information as further described herein.

At step 706, a chunk of data from the data source is moved or copied to or processed by an applicable media management component. This may involve processing on a source computing device prior to movement a NAS device. At step 708, the media management component may issues an applicable write command and generates metadata for the received data (in some embodiments, a data structure including data and metadata, is created). At step 710, a file server receives the write command, the data and the metadata. At step 712, the file server combines the data and metadata, writes the resulting data structure to the NAS.

Figure 8:
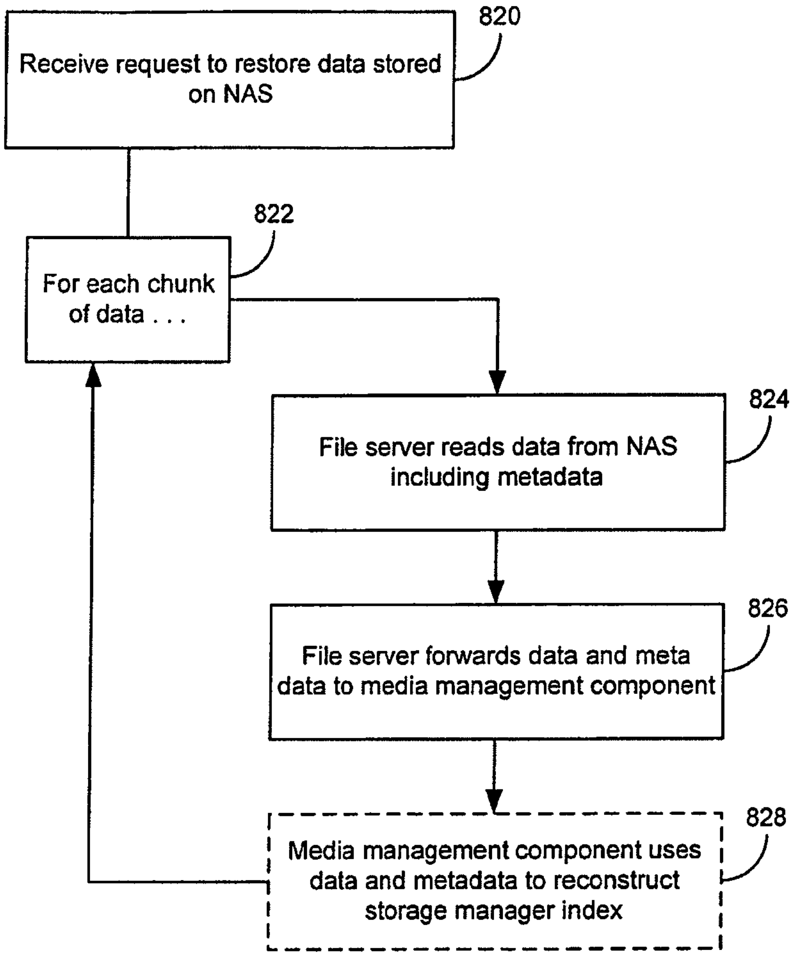
FIG. 8 is a flow chart illustrating some of the steps associated with a method in accordance with an embodiment of the present invention.

Referring to FIG. 8 there is shown a process for retrieving data from a NAS in accordance with an embodiment of the invention. The process may be used with, for example, system 400 shown in FIG. 4. At step 820, a request is received to restore data stored on a NAS. At step 822, a routine, which may be recursive, is initiated for each set or chunk of data which may request a specific chunk, monitor data received and response to the request, and terminate the retrieval operation once the desired data is retrieved.

At step 824, a file server retrieves data and associated metadata from a NAS in response to the request. In some embodiments, the file server may separate, chunk data and metadata and provide each to the media management device. At step 826, the data and metadata may be forwarded to a media management component or a computing device. At step 828, the media management component may use the data and metadata to identify and route the requested information to the source requesting such information and "unpack" or otherwise obtain the data (e.g., a computing device requesting a data restore operation). In certain circumstances, the metadata associated with the stored data may be desired, for example, in the event of a system restore, to reconstruct one or more media management or storage manager indexes.

Referring again back to FIG. 4, NAS module 406 may further include a NAS verification component 407 for verifying that the information requested information is properly stored (or retrieved) from NAS device 450. For example, in operation, NAS verification module 411 may issue a request to file server 454 to restore certain data stored in NAS device 450 to a data destination 412. The request may include, for example, the path stored on NAS device 450, whether backup information stored on NAS 450 was a full or incremental backup, a list of the paths to restore, a destination path, an option not to write the data stored in NAS 450, etc. This request may be issued in order to obtain metadata associated with stored data which may be compared with certain index information to confirm the requested data is available, was properly stored and may be retrieved.

File server 454 may send a retrieve request to NAS 450, that reads data stored on NAS 450, and forwards the responsive data to media management component 405. NAS verification module 407 may read the metadata associated with the retrieved data and forward the data to destination 412. In some embodiments, data destination 412 may be a null or other empty port such as air and does not include a storage medium. This may be performed in cases where only metadata is desired for verification purposes.

Figure 9:
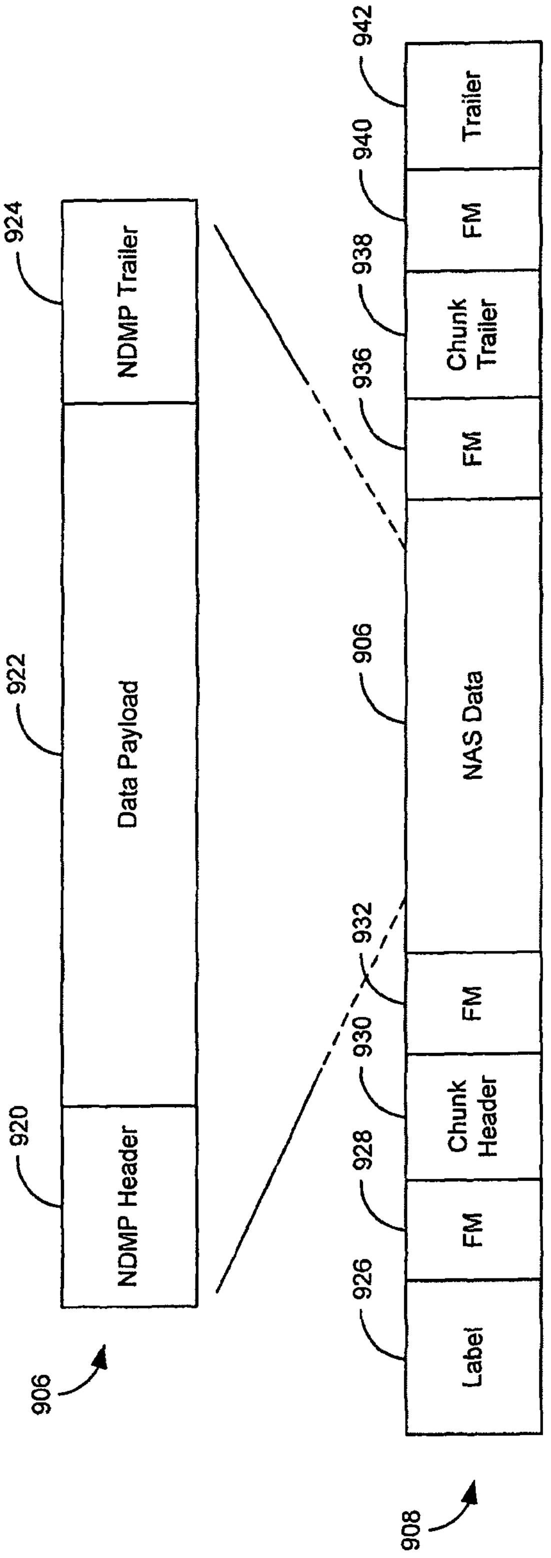
FIG. 9 is a representation of a data structure constructed in accordance with an embodiment of the present invention.

Referring to FIG. 9, a data structure 906 constructed in accordance with the principles of the present invention is shown. As shown, data structure 906 may include a dump header 920, a data payload 922 and a trailer 922. Dump header 920 may include, for example, a description and size of data payload 922, and a list of the files in payload 922. File server 454 may further modify data structure 906 and add a label field 926, a file marker field 928, a chunk header 930, a file marker 932, a file marker 936, a chunk trailer 938, a file marker 940, and a trailer 942 to produce data structure 908. Label 926 may label data structure 908. File markers 928, 932, 936 and 940 may separate different portions of data structure 908. Chunk header 930 may include header information for each chunk of data 922. Similarly, chunk trailer includes trailer information for each chunk of data 922.

NAS verification component 407 receives data from NAS 450 in response to a request and may compare certain information in data structure 908 with information from an index in media management component 405 or storage manager 401. For example, verification component 407 may compare information in dump header 920 to a corresponding entry stored in index cache 430 or in index cache 410. Such information was initially generated when data 906 was first stored on NAS 450. Further, when NAS verification module 407 restores data 908, the restoration process itself generates metadata which may also be compared with meta data stored in index cache 430 or index cache 410 (e.g., unique or somewhat unique rebuild information, etc.).

The results of such comparisons may be used to verify the contents of payload 922 and may be performed using techniques known in the art—such as checksums, hashing, etc. if the comparisons are favorable, media management component 405 then forwards data 908 to data destination 412. In some embodiments, data destination 412 may be a "dummy" device, air or other null port and excludes a storage medium, if the metadata is desired. This increases the speed of the process because less time is uses as compared to media management component 405 actually writing data structure 408 to a storage medium. Further, no extra storage space needs to be utilized.

Figure 10:
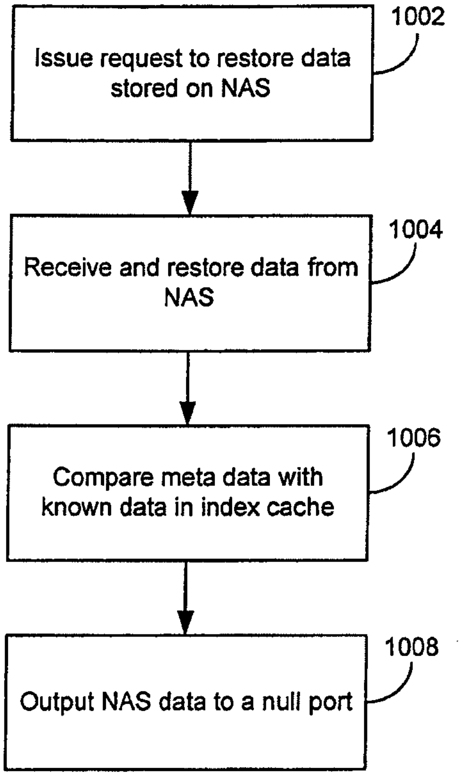
FIG. 10 is a flow chart illustrating some of the steps associated with a method in accordance with an embodiment of the present invention.

Referring to FIG. 10, a flow chart illustrating some of the steps involved in a method for validating data stored on a network attached storage device in accordance with an embodiment of the invention is shown. The method in FIG. 10 may be implemented using, for example, system 400 discussed above. At step 1002, a request is made to restore data stored on a NAS. This may involve a computing device or storage manager contacting a media management component with such as request. Next, at step 1004, a media management component may communicate with a NAS device through a file server and locate the data requested. After the requested data has been located, data from the NAS may be retrieved and sent from the file server and restored. At step 1006, certain metadata such as a dump header or other portions from the data stored in the NAS may be extracted and compared with metadata stored in an index cache. If the comparison is favorable, the metadata or other data may be used for system restore or management purposes. For example, this information may be used to verify that the requested information is stored on the NAS device and may be retrieved, if necessary (e.g., for repopulating a computing device with application data or repopulating a management database with system management information, etc.).

If the comparison is unfavorable, the query may be processed several times, until a favorable result is obtained, or until a certain number of unfavorable results are obtained, in which the query may terminate as a time out, and system indexes or processes updated to reflect the requested information could not be found, and therefore not retrieved. Assuming that a favorable result is obtained, the metadata may be retrieved and the data from the NAS is sent to a null port which does not include a storage medium (step 1008). Moreover, data that has been obtained may be merged into any existing media management or storage manager database to repopulate an index or other databases in the event a restore is desired.

Thus, by requesting to restore data from a NAS and reading header and/or other metadata from the NAS data, a system and method for verifying data stored on a NAS is realized.

As shown in FIG. 4, NAS module 406 may further include a NAS browsing component 409 for allowing a user to browse information or data stored on NAS device 450. For example, in operation, NAS browsing component 409 may be invoked, for example, on a computing device 485 and issue a request to media management component 405 for information regarding certain data stored in NAS device 450. The request may include, for example, a request for a file system overview of the files stored on NAS device 450, including certain information or properties about those files.

Figure 11:
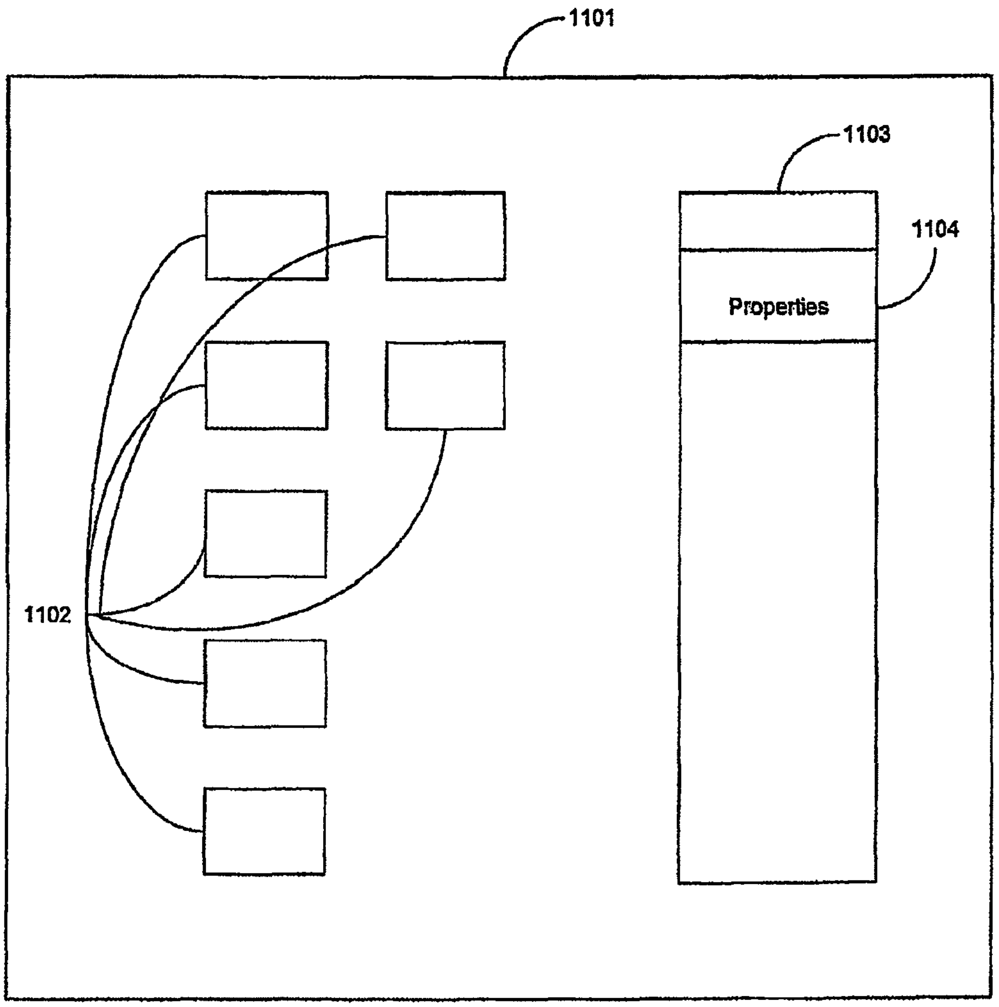
FIG. 11 is an illustration of a graphical user interface constructed in accordance with an embodiment of the present invention.

Once the information is obtained, a graphical user interface on a computing device may display the information in a familiar graphical file format with an icon representing each file. This is generally shown in FIG. 11. As shown, screen 1101 may be similar to a WINDOWS file system display screen, which may include file icons 1102 representing NAS files under management. In operation, a user may select one of icons 1102 and invoke a pulldown or other menu 1103 which lists a set of options or operations that may be performed on the various files shown. For example, this may include a properties selection which may display various properties of the files under management including the size of the data, path information, offsets, client ID information, application information, date copied, storage policies associated with the data, information relating to the source data such as, which archive file a chunk may be associated with, what files are in the chunk, chunk number, and any other data useful for data management, etc.

The user may obtain this information by choosing a particular file 1102 and selecting the properties option 1104 from pull down menu 1103. It will be understood each property may be presented in a layered or tiered format that additional details may be obtained by clicking or selecting a particular property and that other options may also be available (not shown).

Figure 12:
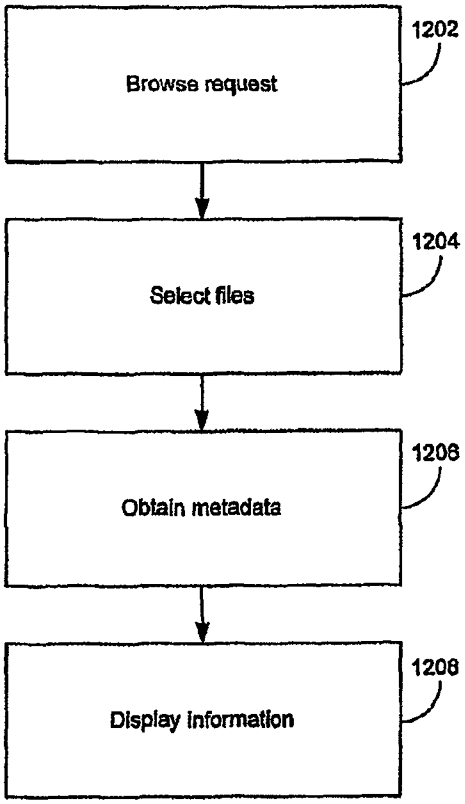
FIG. 12 is a flow chart illustrating some of the steps associated with a method in accordance with an embodiment of the present invention.

Referring to FIG. 12, a flow chart illustrating some of the steps involved in a method for browsing data stored on a network attached storage device in accordance with an embodiment of the invention is shown. The method in FIG. 12 may be implemented using, for example, system 400 discussed above. At step 1202, a request may be made to view files stored on one or more NAS devices. This may involve a user invoking a browser on a computing device. At this point the user may be prompted to select a certain network of interest. Once selected, the system may scan the selected network(s) for associated NAS devices. A list of available devices may be displayed, from which the user may choose one or more devices of interest. In some embodiments, a user may request a list of files or application programs, and the system may generate a list of available NAS devices that include the specified information.

Once a user selects one or more NAS devices from the list, a query may sent to the system of those devices for a list of files under management. The system may obtain these lists, for example, from a system index or through direct queries to the NAS devices. Next, at step 1204, the user may select certain files to receive more information about them. This may involve the restoration process described above where files are restored to obtain metadata for browsing purposes (step 1206).

Next, at step 1208, the information may be displayed to the user for further inspection. At this point, the user may further direct operations with respect to the displayed files. For example, the user may direct a full or partial data restore from the NAS device and may direct certain clients be repopulated with the restored data. Similarly, the user may update or refresh certain system management components such as a storage manager database or index or media management component index to be updated. Other operations are also contemplated, such as directing the copying of data or management information to a disk, other portable media or to another network location.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

Moreover, it will be appreciated that the systems and methods provided herein are intended to exemplary and not limiting and that additional elements or steps may be added or performed in different order, if desired.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for managing data in a storage system, the method comprising:

receiving a request to store data on a Network-Attached Storage (NAS) Device, wherein the data comprises data files stored on a first storage device with a first file management system, and the Network-Attached Storage (NAS) Device comprises a second file management system that is different than the first file management system;

combining a plurality of the multiple data files in the source data into at least one chunk of data;

creating a first data structure that comprises a first header and the chunk of data;

receiving the first data structure at a file server comprising computer hardware, the file server remotely located from the Network-Attached Storage (NAS) Device;

creating a second data structure with the file server, wherein the file server adds at least a second header and a trailer to the first data structure, the second header comprising at least a set of file markers that identify the plurality of data files in the chunk of data, the trailer comprising at least metadata about the plurality of data files in the chunk of data; and transferring the second data structure to the Network-Attached Storage (NAS) Device, wherein the second data structure is stored with the second file management system.

2. The method of claim 1 wherein transferring the second data structure to the Network-Attached Storage (NAS) Device is performed by the file server.

3. The method of claim 1 wherein the file server receives the first data structure via a first network protocol.

4. The method of claim 1 wherein the file server writes the second data structure to the Network-Attached Storage (NAS) Device via a second network protocol.

5. The method of claim 4 wherein the second network protocol is a Network Data Management Protocol.

6. The method of claim 1 wherein the trailer further comprises a second set of file markers that identify the plurality of data files in the chunk of data.

7. The method of claim 1 further comprising storing information about the plurality of files in the chunk of data.

8. The method of claim 1 further comprising browsing the plurality of files in the chunk of data by accessing information stored by the media agent.

9. The method of claim 1 wherein, in response to a request, the file server retrieves the second data structure from the Network-Attached Storage (NAS) Device.

10. The method of claim 9 wherein the media agent unpacks the plurality of files in a chunk of data retrieved from the Network-Attached Storage (NAS) Device.

11. A system for managing data in a storage system, the system comprising:

a storage device that stores multiple data files with a first file management system;

a media agent component comprising computer hardware that is in communication with the data source, the media agent receives a request to store source data on a Network-Attached Storage (NAS) Device;

wherein the media agent component combines a plurality of the multiple data files in the source data into at least one chunk of data;

wherein the media agent component creates a first data structure that comprises a first header and the chunk of data; and a file server comprising computer hardware that is remotely located from a Network-Attached Storage (NAS) Device, wherein the file server receives the first data structure, and creates a second data structure comprising at least a second header, the first data structure, and a trailer, the second header comprising at least a set of file markers that identify the plurality of data files in the chunk of data, the trailer comprising at least metadata about the plurality of data files in the chunk of data; and wherein the file server transfers the second data structure to the Network-Attached Storage (NAS) Device, and the Network-Attached Storage (NAS) Device stores the second data structure with the second file management system.

12. The system of claim 11 wherein the file server receives the first data structure via a first network protocol.

13. The system of claim 11 wherein the file server writes the second data structure to the Network-Attached Storage (NAS) Device via a second network protocol.

14. The system of claim 13 wherein the second network protocol is a Network Data Management Protocol.

15. The system of claim 11 wherein the trailer further comprises a second set of file markers that identify the plurality of data files in the chunk of data.

16. The system of claim 11 wherein the media agent stores information about the plurality of files in the chunk of data.

17. The system of claim 11 wherein a user browses the plurality of files in the chunk of data by accessing information stored by the media agent.

18. The system of claim 11 wherein the file server retrieves the second data structure from the Network-Attached Storage (NAS) Device in response to a request.

19. The system of claim 18 wherein the media agent unpacks the plurality of files in a chunk of data retrieved from the Network-Attached Storage (NAS) Device.

* * * * *